United States Patent
Iwaki et al.

(10) Patent No.: US 12,230,954 B2
(45) Date of Patent: Feb. 18, 2025

(54) PROTECTION SYSTEM

(71) Applicant: Panasonic Intellectual Property Management Co., Ltd., Kadoma (JP)

(72) Inventors: Hideki Iwaki, Osaka (JP); Hideki Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/424,152

(22) Filed: Jan. 26, 2024

(65) Prior Publication Data

US 2024/0170942 A1    May 23, 2024

Related U.S. Application Data (63) Continuation of application No. 17/437,831, filed as application No. PCT/JP2020/012863 on Mar. 24, 2020, now Pat. No. 11,923,672.

(30) Foreign Application Priority Data

Mar. 26, 2019  (JP) ................................ 2019-057582

(51) Int. Cl.
  *H02H 3/033*  (2006.01)
  *H02H 1/00*   (2006.01)
  *H02H 3/08*   (2006.01)

(52) U.S. Cl.
  CPC .......... *H02H 3/033* (2013.01); *H02H 1/0007* (2013.01); *H02H 3/08* (2013.01)

(58) Field of Classification Search
  CPC ......... H02H 3/033; H02H 3/08; H02H 1/0007
  See application file for complete search history.

(56) References Cited

U.S. PATENT DOCUMENTS

| 8,217,740 B2 | 7/2012 | Nakagawa |
| 10,276,314 B2 | 4/2019 | Minke et al. |

(Continued)

FOREIGN PATENT DOCUMENTS

| JP | 2010-277802 A | 12/2010 |
| JP | 2011-211835 A | 10/2011 |
| JP | 2012-199136 A | 10/2012 |

OTHER PUBLICATIONS

International Search Report of PCT application No. PCT/JP2020/012863 dated Jun. 23, 2020.

*Primary Examiner* — Scott Bauer
(74) *Attorney, Agent, or Firm* — WHDA, LLP (57) ABSTRACT

A protection system includes: a first positive terminal; a second positive terminal; a first relay configured to be opened and closed by contact and separation of a first contact portion and a second contact portion; and a fuse. The first relay and the fuse are connected in series between the first positive terminal and the second positive terminal, and when an electric current exceeding a threshold current flows to the first relay, the first contact portion and the second contact portion are separated in the first relay at a first time, and when the first contact portion and the second contact portion are separated, an arc discharge occurs between the first contact portion and the second contact portion, an arc discharge occurs between the first electrode and the second electrode of the fuse at a second time, the arc discharge occurs at both of the first relay and the fuse and a difference in potential between the first electrode and the second electrode of the fuse increases during a period between the second time and a third time, and the first positive terminal and the second positive terminal are disconnected at a fourth time.

8 Claims, 7 Drawing Sheets

(56) References Cited

U.S. PATENT DOCUMENTS

| | | |
|---|---|---|
| 2005/0002152 A1 | 1/2005 | Gemme et al. |
| 2007/0109704 A1 | 5/2007 | Apfelbacher et al. |
| 2010/0301974 A1 | 12/2010 | Nakagawa |
| 2014/0034613 A1 | 2/2014 | West |
| 2018/0145498 A1* | 5/2018 | Handy ................ H02H 3/023 |
| 2019/0348245 A1 | 11/2019 | Henricks |
| 2019/0371561 A1* | 12/2019 | Ehrhardt ............. H01H 85/08 |
| 2021/0183607 A1* | 6/2021 | Schlaak ............... H01H 89/00 |

\* cited by examiner

FIG. 7

PROTECTION SYSTEM

CROSS REFERENCE TO RELATED APPLICATIONS

This application is a Continuation of U.S. patent application Ser. No. 17/437,831, filed Sep. 9, 2021, which is a National Stage Entry of International Application No. PCT/JP2020/012863 filed Mar. 24, 2020, which claims the benefit of Japanese Patent Application No. 2019-057582 filed in the Japan Patent Office on Mar. 26, 2019, each of which is incorporated by reference herein in its entirety.

TECHNICAL FIELD

The present disclosure relates to protection systems that are used in various electrical devices.

BACKGROUND ART

Hereinafter, a relay used in a conventional protection device will be described. The conventional relay is controlled so that a movable terminal and a fixed terminal come in contact with or are separated from each other in order to electrically connect or disconnect a first circuit unit and a second circuit unit.

Note that Patent Literature (PTL) 1, for example, is known as related art document information pertaining to the present application.

CITATION LIST

Patent Literature

PTL 1: Unexamined Japanese Patent Publication No. 2012-199136

SUMMARY OF THE INVENTION

In the conventional relay, when the movable terminal and the fixed terminal are connected via a contact, a large electric current flows to the contact between the movable terminal and the fixed terminal. If the area of a portion where the movable terminal and the fixed terminal are in contact is small, large electric currents converge and flow through said portion in contact. Accordingly, there are cases where a repulsive magnetic force is generated across the contact, the contact is disconnected, and an electric arc is generated. Furthermore, the contact may be damaged due to the generation of the electric arc, and an electric current flowing to the contact between the movable terminal and the fixed terminal may become unstable, meaning that the control on the relay will require time.

In view of this, the pressing force to be applied to a movable unit of the relay is increased so that a pressing force greater than the repulsive magnetic force generated between the movable terminal and the fixed terminal is applied to the movable unit to stabilize the state where the movable terminal and the fixed terminal are in contact at the contact. As another method, the movable terminal or the fixed terminal is formed into a special shape to reduce the repulsive magnetic force, and thus the state where the movable terminal and the fixed terminal are in contact is stabilized.

However, the aforementioned configuration causes an increase in the size of the relay or the protection device including the relay. Furthermore, the weight of the relay or the protection device including the relay increases.

Thus, the present disclosure has an object to downsize a conventional protection system.

A protection system according to the present disclosure includes: a first positive terminal; a second positive terminal; a first relay including a first contact portion and a second contact portion, the first relay being configured to be opened and closed by contact and separation of the first contact portion and the second contact portion; and a fuse including a first electrode and a second electrode. The first relay and the fuse are connected in series between the first positive terminal and the second positive terminal. When an electric current exceeding a threshold current flows to the first relay, the first contact portion and the second contact portion are separated in the first relay at a first time after an electric current flowing to the first relay exceeds the threshold current. When the first contact portion and the second contact portion are separated, an arc discharge occurs between the first contact portion and the second contact portion. An arc discharge occurs between the first electrode and the second electrode of the fuse at a second time later than the first time. The arc discharge occurs at both of the first relay and the fuse and a difference in potential between the first electrode of the fuse and the second electrode of the fuse increases during a period between the second time and a third time later than the second time. The first positive terminal and the second positive terminal are disconnected at a fourth time later than the third time.

DESCRIPTION OF EMBODIMENT

Exemplary Embodiment

Hereinafter, an exemplary embodiment of the present disclosure will be described with reference to the drawings.

Figure 1:
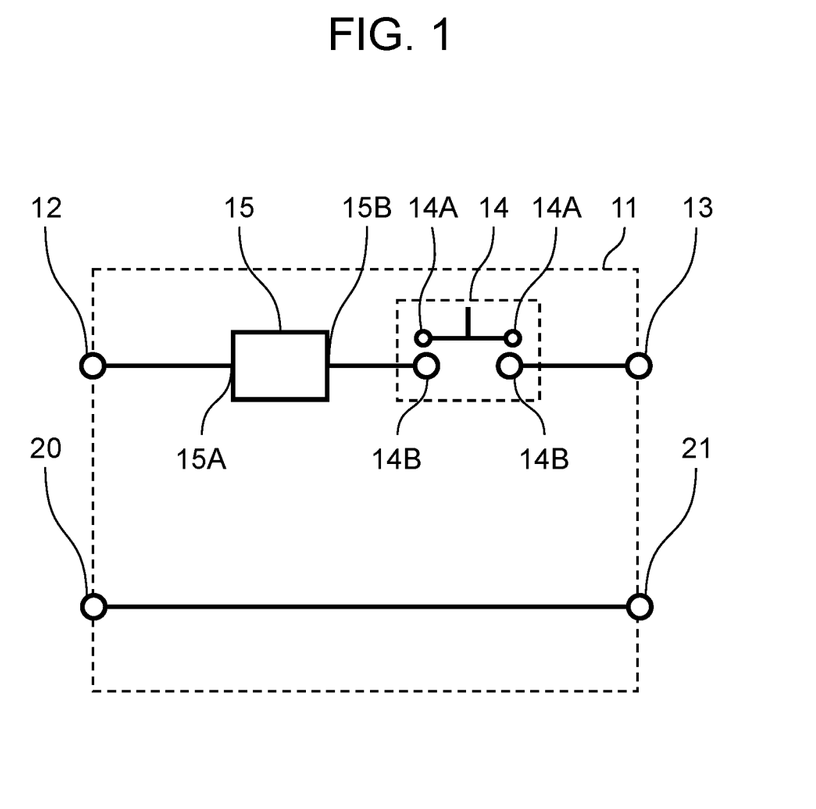
FIG. 1 is a block diagram illustrating the configuration of a protection device according to an exemplary embodiment of the present disclosure.
Figure 2:
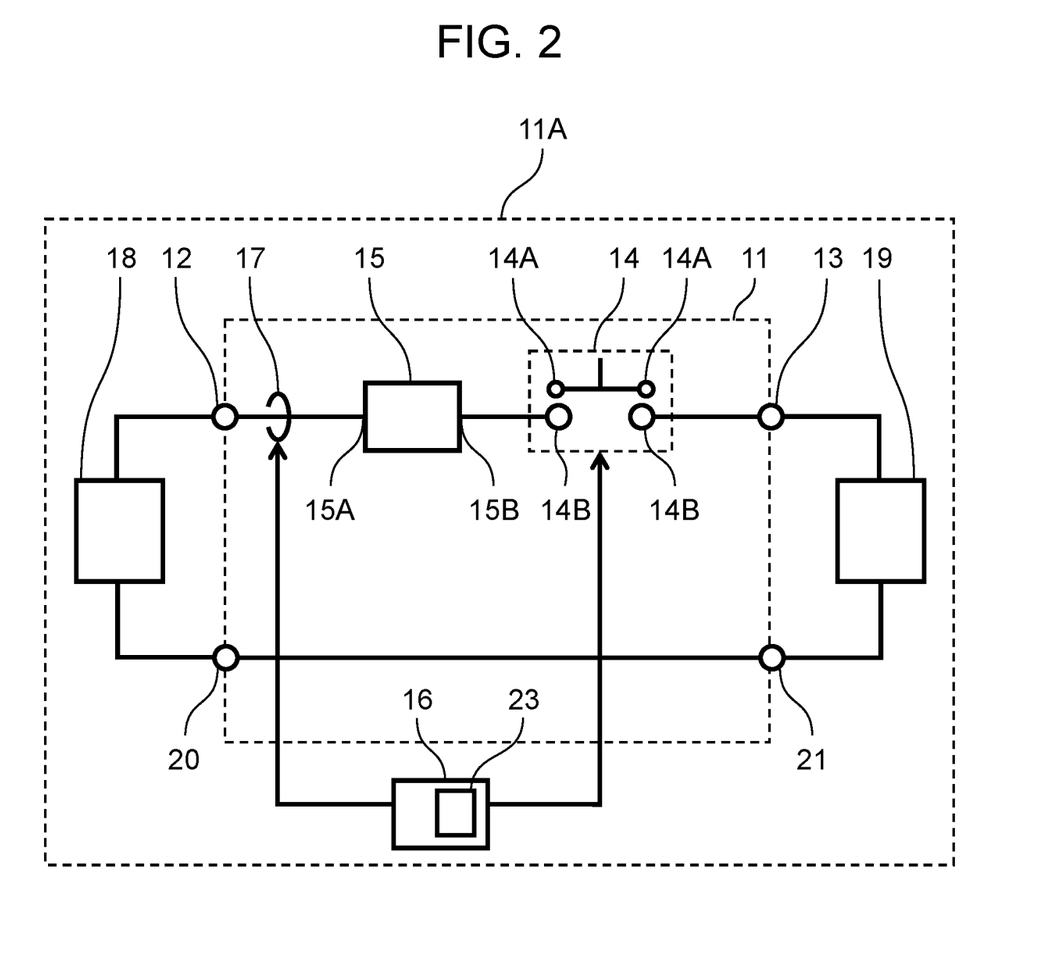
FIG. 2 is a block diagram illustrating the configuration of a protection system according to an exemplary embodiment of the present disclosure.

FIG. 2 is a block diagram illustrating the configuration of protection system 11A according to the exemplary embodiment of the present disclosure. Note that FIG. 1 illustrates protection device 11 used in protection system 11A illustrated in FIG. 2.

Note that the same elements in FIG. 1 and FIG. 2 share the same reference marks and description thereof may be omitted.

As illustrated in FIG. 2, protection device 11 includes a positive electric potential-side terminal (terminal 12), a positive electric potential-side terminal (terminal 13), relay 14, fuse 15, and controller 16. Controller 16 includes relay driver 23. Note that although controller 16 includes relay driver 23 in the present exemplary embodiment, controller 16 and relay driver 23 may be configured separately. Relay 14 and fuse 15 are connected in series between terminal 12 and terminal 13. Relay 14 is closed when contact portion 14A and contact portion 14B come into contact, and is opened when contact portion 14A and contact portion 14B are separated. Fuse 15 includes electrode 15A and electrode 15B.

Note that in the present disclosure, there are cases where the positive electric potential-side terminal is denoted as a "positive terminal" and the negative electric potential-side terminal is denoted as a "negative terminal".

Next, changes in electric currents at relay 14 and fuse 15 will be described with reference to FIG. 2 and FIG. 3.

In protection system 11A, when electric current I flowing to relay 14 reaches the value of an electric current greater than short circuit capacity electric current Ith1 (threshold current) of relay 14, contact portion 14A and contact portion 14B are separated from each other, and an arc discharge occurs between contact portion 14A and contact portion 14B. In FIG. 3, time T1 indicates a point in time at which electric current I flowing to relay 14 exceeds short circuit capacity electric current Ith1. Specifically, at time t1, contact portion 14A and contact portion 14B are separated, and an arc discharge occurs between contact portion 14A and contact portion 14B. Note that at this time, fuse 15 is connected, and no arc discharge occurs at fuse 15.

When time passes, fuse 15 blows, and at time T2, fuse 15 initiates an arc discharge. In other words, the arc discharge occurs at both of relay 14 and fuse 15 during the period between time T2 and time T3. Furthermore, the difference in potential between one electrode (electrode 15A) and the other electrode (electrode 15B) of fuse 15 increases.

Subsequently, the difference in potential between electrode 15A and electrode 15B decreases, and at time T3, electric current I begins to sharply decrease. Thereafter, at time T4, the electric current flowing between terminal 12 and terminal 13 is completely cut off.

In protection system 11A according to the present exemplary embodiment, as a result of an overcurrent flowing to relay 14 as electric current I (as a result of electric current I exceeding first threshold value Ith1), contact portion 14A and contact portion 14B are separated, and relay 14 initiates an arc discharge (time T1). Furthermore, in the state where electric current I remains to be the overcurrent due to the arc discharge at relay 14, fuse 15 also initiates an arc discharge (time T2). Subsequently, in the state where the arc discharge at both of relay 14 and fuse 15 is maintained, impedance of both ends of fuse 15 is sharply increased (refer to time T2 to time T3 in FIG. 4). The impedance of both ends (electrode 15A, electrode 15B) of fuse 15 is sharply increased, and the difference in potential between both ends (electrode 15A, electrode 15B) of fuse 15 is increased once and then decreased. At this time, the electric current flowing to protection system 11A is reduced.

This means that with the electric arcs at both of relay 14 and fuse 15, the impedance of both of relay 14 and fuse 15 sharply increases. Thus, in the present exemplary embodiment, terminal 12 and terminal 13 can be electrically disconnected in a short time. As a result, a mechanism for coercively maintaining the connection of contact portion 14A and contact portion 14B is no longer needed, and relay 14 can be small in size.

In protection system 11A according to the present exemplary embodiment, fuse 15 can be placed in a high impedance state in a short time, and protection system 11A can be small in size.

Hereinafter, protection system 11A according to the present exemplary embodiment will be described in more detail.

As mentioned earlier, protection system 11A includes terminal 12 (positive electric potential-side terminal), terminal 13 (positive electric potential-side terminal), relay 14, fuse 15, and controller 16. Fuse 15 may be a melting fuse or may be an explosive fuse. In the case where an explosive fuse is used as fuse 15, the timing of explosion is controlled according to a signal or the like transmitted from controller 16 to fuse 15.

The following describes the case where a melting fuse is used as fuse 15.

Protection system 11A includes protection device 11 and controller 16; in protection device 11, terminal 12 which is a positive electric potential-side terminal, terminal 13 which is a positive electric potential-side terminal, relay 14, and fuse 15 are provided.

When electric current I flowing to protection system 11A is less than or equal to first threshold value Ith1 and the conduction and cut-off control for relay 14 is possible, the power cut-off through protection device 11 can be controlled according to a signal from controller 16.

On the other hand, when electric current I flowing to protection system 11A is greater than first threshold value Ith1, the power cut-off through protection device 11 is performed as follows. When electric current I is greater than first threshold value Ith1, an arc discharge occurs between contact portion 14A and contact portion 14B of relay 14 according to a control signal transmitted from controller 16 to relay 14 even if contact portion 14A and contact portion 14B are separated. Therefore, the relay cut-off cannot be controlled by controller 16 alone.

Thus, in the present exemplary embodiment, the power cut-off through protection device 11 is achieved by changing the impedance of each of relay 14 and fuse 15 through cooperation of relay 14 and fuse 15 using the arc discharge occurring at relay 14 and the arc discharge occurring at fuse 15 in the overcurrent state.

This will be described in detail below.

Suppose that the upper limit of the electric current flowing to protection device 11 in the state where contact portion 14A and contact portion 14B of relay 14 are not separate from each other is first threshold value Ith1. When electric current I exceeding first threshold value Ith1 flows to protection device 11, contact portion 14A and contact portion 14B of relay 14 are separated from each other, and an arc discharge occurs between contact portion 14A and contact portion 14B. The occurrence of the arc discharge between contact portion 14A and contact portion 14B allows contact portion 14A and contact portion 14B to remain electrically connected to each other. With the arc discharge between contact portion 14A and contact portion 14B, an arc discharge occurs at fuse 15 even when fuse 15 is in a blown state. Thereafter, as the arc discharge at both of relay 14 and fuse 15 changes, the impedance of relay 14 and fuse 15 increases over time, and thus protection device 11 enters into a disconnected state.

Controller 16 constantly detects, by using electric current sensor 17, electric current I flowing to terminal 12. Electric current sensor 17 may be an electric current sensor including a magnetoelectric device such as a hall device. Electric current sensor 17 may be an electric current sensor including a shunt resistor or the like. Furthermore, the calculation on electric current I may be performed in electric current sensor 17. The calculation on electric current I may be performed in controller 16. Here, as one example, controller 16 uses electric current sensor 17 to detect electric current I flowing to terminal 12, but this is not limiting. Electric current I may be detected by detecting an electric current flowing to relay 14. Electric current I may be detected by detecting an electric current flowing to fuse 15.

In the present exemplary embodiment illustrated in FIG. 2, direct-current power supply 18 is connected to terminal 12. Furthermore, load 19 is connected to terminal 13. In other words, electric power is supplied from direct-current power supply 18 to load 19 in FIG. 2, that is, from the left to the right in the figure. The protection system according to the present disclosure is not limited to the form illustrated in FIG. 2 and may be configured such that direct-current power supply 18 is connected to terminal 12, a charging power supply is connected to terminal 13 (not illustrated in the drawings), and thus electric power is supplied from the right to the left in the figure.

Relay 14 and fuse 15 are connected in series between terminal 12 and terminal 13. Although the polarity of direct-current power supply 18 is not indicated here, relay 14 and fuse 15 are connected in series to the positive electric potential-side terminals (between terminal 12 and terminal 13). Note that relay 14 and fuse 15 may be connected in series to the negative electric potential-side terminals (between terminal 20 and terminal 21), as illustrated in FIG. 5.

Figure 5:
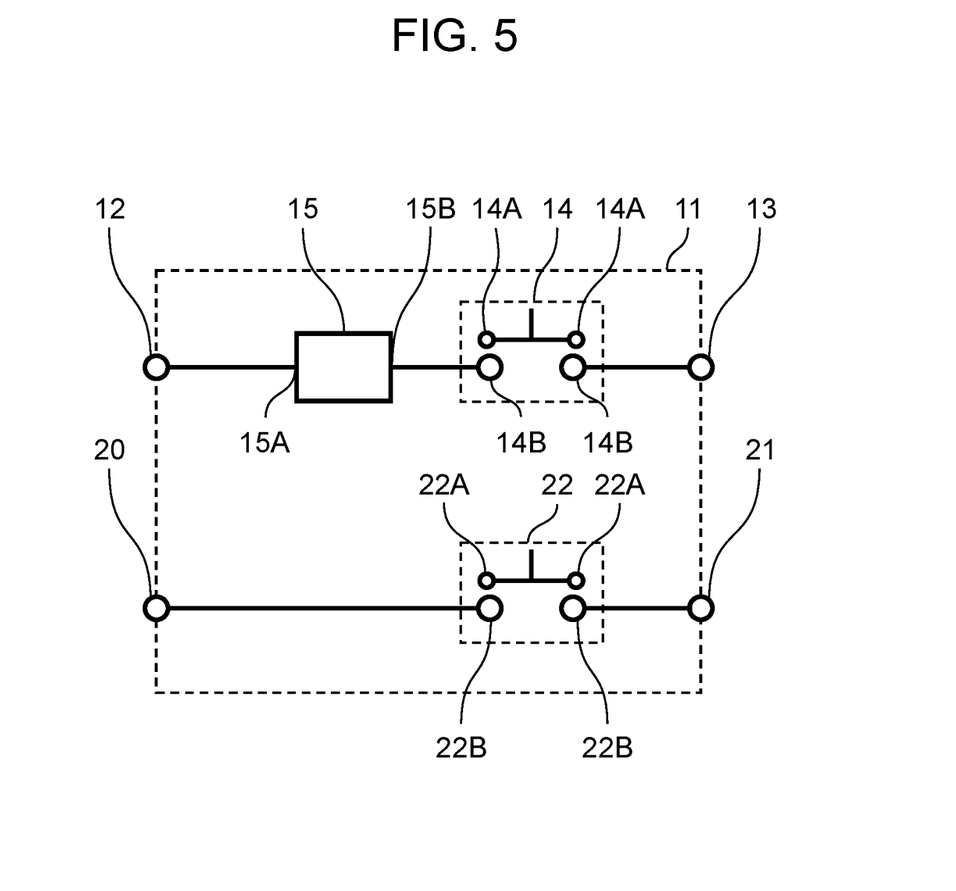
FIG. 5 is a block diagram illustrating the configuration of a protection system according to another exemplary embodiment of the present disclosure.

Note that in protection system 11A illustrated in FIG. 2, protection device 11 illustrated in FIG. 5 may be used instead of protection device 11 illustrated in FIG. 1. The difference between protection device 11 illustrated in FIG. 1 and protection device 11 illustrated in FIG. 5 is that relay 22 is further provided between terminal 20 and terminal 21 in protection device 11 illustrated in FIG. 5.

Next, protection device 11 illustrated in FIG. 5 will be described in detail.

As illustrated in FIG. 5, a series body of relay 14 and fuse 15 is connected to the positive electric potential, between terminal 12 and terminal 13. Relay 22 is connected between terminal 20 and terminal 21. The series body of relay 14 and fuse 15 is connected to the negative electric potential, between terminal 20 and terminal 21, and relay 22 is connected between terminal 12 and terminal 13.

Controller 16 (refer to FIG. 2) controls the operations of relay 14 and relay 22. More specifically, relay 14 is disconnected or connected under control by separation or contact of contact portion 14A and contact portion 14B using a magnetic force excited on a coil unit (not illustrated in the drawings) by an electric current and a voltage supplied from controller 16. Similarly, relay 22 is disconnected or connected under control by separation or contact of contact portion 22A and contact portion 22B using a magnetic force excited on a coil unit (not illustrated in the drawings) by an electric current and a voltage supplied from controller 16.

Relay 14 and relay 22 have substantially the same properties, and controller 16 (refer to FIG. 2) performs the same control on relay 14 and relay 22. Furthermore, regarding the occurrence of electric arcs, changes in impedance, etc., to be described below, relay 14 and relay 22 exhibit substantially the same changes, dynamics, etc. Therefore, the following description focuses on relay 14.

When electric current I flowing to terminal 12 has an electric current value less than first threshold value Ith1, contact portion 14A and contact portion 14B of relay 14 are subject to opening/closing control of controller 16. When electric current I flowing to terminal 12 has an electric current value less than first threshold value Ith1 and an electric current greater than the fusing current of fuse 15 flows, fuse 15 blows, and the conduction between terminal 12 and terminal 13 is cut off. There are cases where controller 16 causes contact portion 14A and contact portion 14B of relay 14 to be separated and thus relay 14 is disconnected before fuse 15 cuts off the conduction between terminal 12 and terminal 13.

Specifically, first threshold value Ith1 for electric current I is a value on a boundary between separation and non-separation of contact portion 14A and contact portion 14B. When electric current I is greater than first threshold value Ith1, an electric arc occurs even with contact portion 14A and contact portion 14B of relay 14 separated. This means that when electric current I is greater than first threshold value Ith1, protection device 11 cannot be controlled by controller 16 alone.

However, in a strict sense, there is a region where the connection state of relay 14 is unstable between first threshold value Ith1 and second threshold value Ith2 which is slightly less than first threshold value Ith1. Specifically, when the electric current is slightly less than first threshold value Ith1, there are cases where a repulsive magnetic force is generated between contact portion 14A and contact portion 14B and thus, the connection state becomes unstable. In other words, strictly speaking, even in the state where electric current I less than or equal to first threshold value Ith1 flows, controller 16 may not necessarily be able to control connection and disconnection of relay 14.

Thus, in the present exemplary embodiment, an electric current value at which an electric arc occurs between contact portion 14A and contact portion 14B of relay 14 is described as first threshold value Ith1.

When electric current I flowing to terminal 12 has an electric current value greater than first threshold value Ith1 at time T1 due to factors such as short-circuiting of load 19, contact portion 14A and contact portion 14B that have been in contact until time T1 are separated at time T1 independently of the control of controller 16. This is attributable to a repulsive magnetic force being generated between contact portion 14A and contact portion 14B as electric current I flowing to terminal 12 becomes an overcurrent. Furthermore, an arc discharge occurs between contact portion 14A and contact portion 14B that are separate. At relay 14, an arc discharge occurs during the period between time T1 and time T2 after electric current I exceeds first threshold value Ith1 at initial time T1.

As mentioned earlier, it is sufficient that first threshold value Ith1 be set to an electric current value greater than the short circuit capacity electric current of relay 14 and be set to a value at which the arc discharge occurs without fail or an electric current value equivalent to the value at which the arc discharge occurs without fail. As electric current I flowing to terminal 12 exceeds first threshold value Ith1, the repulsive magnetic force that is generated between contact portion 14A and contact portion 14B becomes greater than the force pressing contact portion 14A and contact portion 14B against each other in relay 14. Thus, the arc discharge occurs first between contact portion 14A and contact portion 14B.

Furthermore, as a procedure different from the above-described procedure, when controller 16 detects that electric current I has a value greater than first threshold value Ith1 at initial time T0, controller 16 may instruct relay 14 to separate contact portion 14A and contact portion 14B. Here, controller 16 may control the operation of relay 14 by reducing an electric current to be supplied to a coil unit (not illustrated in the drawings) that is embedded in relay 14 and generates a magnetic force.

Figure 3:
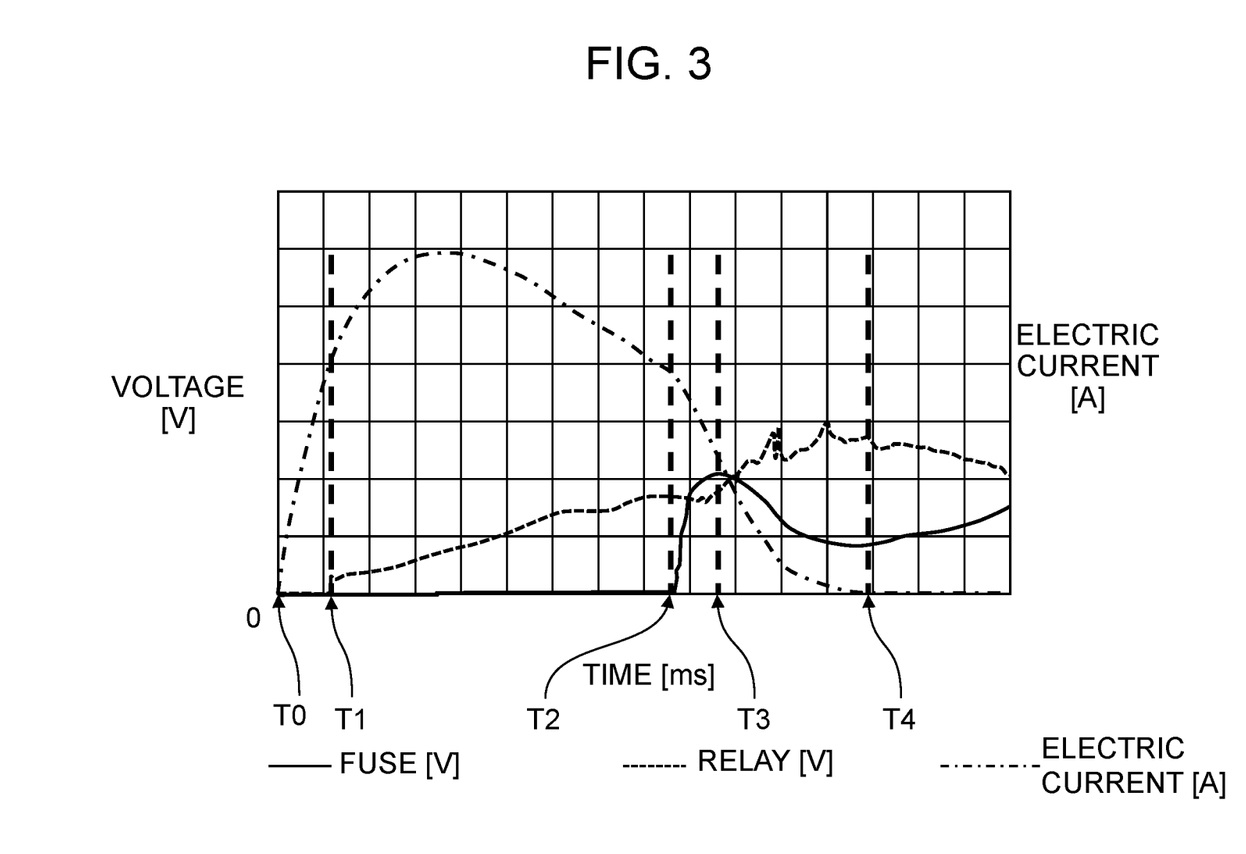
FIG. 3 shows electric current and voltage characteristics of a protection device according to an exemplary embodiment of the present disclosure.
Figure 4:
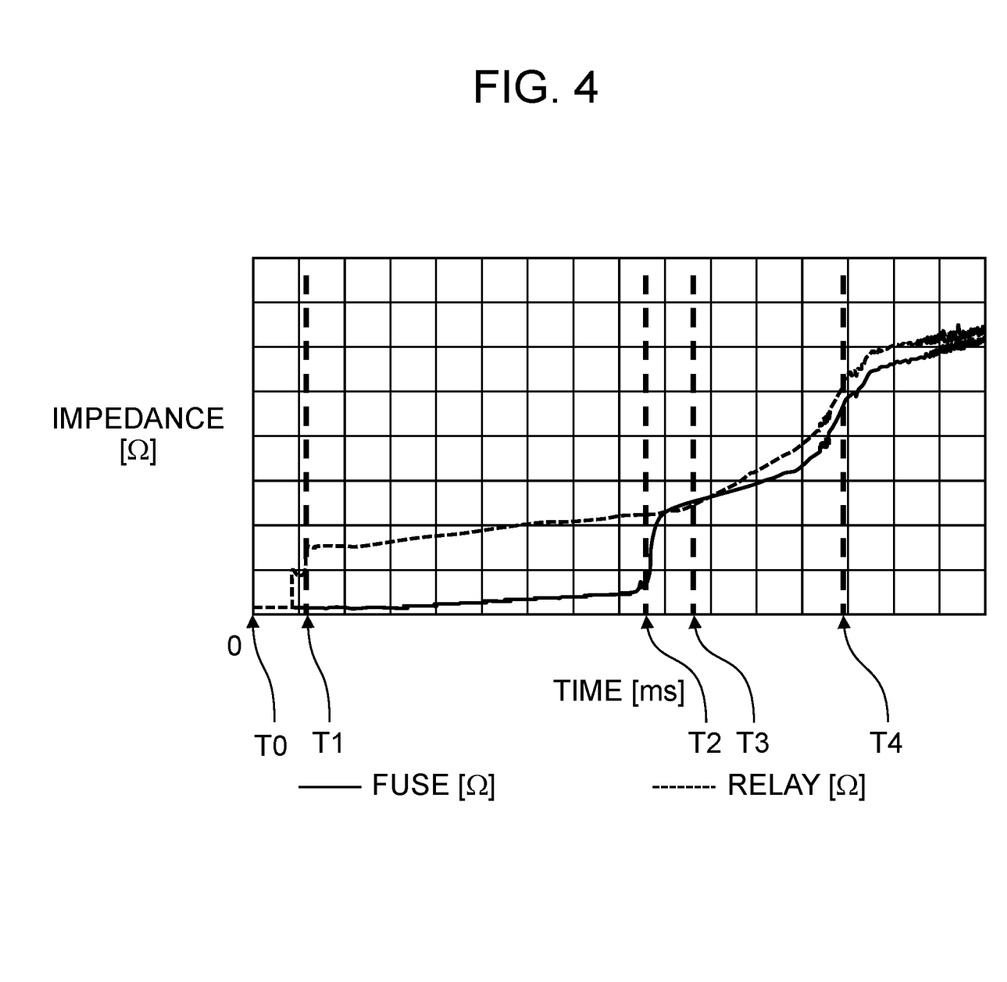
FIG. 4 shows impedance characteristics of a protection device according to an exemplary embodiment of the present disclosure.

Detecting, by controller 16 referring to a difference in potential between both ends of relay 14, that the arc discharge has occurred at relay 14 corresponds to time T1 in FIG. 3. The difference in potential between both ends of relay 14 increases sharply from time T1. Time T1 may be the timing at which the difference in potential between both ends of relay 14 exceeds threshold value Vd1. Time T1 corresponds to the timing at which the impedance of relay 14 increases sharply as illustrated in FIG. 4.

Subsequently, at time T2 later than time T1, the arc discharge occurs between electrode 15A and electrode 15B in fuse 15. The properties of relay 14 and fuse 15 need to be set such that at time T2, rather than the arc discharge at relay 14, the arc discharge at fuse 15 occurs. In other words, protection device 11 may be used which has properties such that time T2, at which the electric arc occurs at fuse 15 after fuse 15 blows, comes after time T1, at which the electric arc occurs at relay 14 after electric current I exceeds first threshold value Ith1. A condition under which fuse 15 blows may be set substantially equal to first threshold value Ith1 or greater than first threshold value Ith1. Generally, as illustrated in FIG. 3, electric current I continues to increase even after exceeding first threshold value Ith1 because of the effects of the transient phenomena or the like, and at some time later than time T1, electric current I reaches a local maximum value and then gradually decreases. Therefore, the condition under which fuse 15 blows may be set greater than first threshold value Ith1.

As mentioned earlier, fuse 15 may be of the type that explodes for disconnection, and time T2 may be the timing of explosion.

As an alternative method, controller 16 may adjust time T1 by adjusting an electric current and a voltage that are required to drive relay 14. Time for disconnection may be controlled by adjusting a temporal difference between time T1 and time T2. Here, electric current supply or voltage control required to drive relay 14 may be performed from relay driver 23. Controller 16 controls the operation of relay driver 23. Note that as mentioned above, relay driver 23 may be included in controller 16 or controller 16 and relay driver 23 may be separate circuit blocks.

Furthermore, the arc discharge occurs at both of relay 14 and fuse 15 during the period between time T2 and time T3 later than time T2 by electric current I flowing between terminal 12 and terminal 13. As mentioned earlier, electric current I continues to increase after exceeding first threshold value Ith1, as illustrated in FIG. 3, and therefore the arc discharge also occurs at fuse 15 while the arc discharge still occurs at relay 14. Furthermore, fuse 15 changes from the connected state to the arc-discharge conducting state at time T2, and thus the impedance between electrode 15A and electrode 15B of fuse 15 sharply increases immediately after time T2, as illustrated in FIG. 4. As illustrated in FIG. 3, electric current I increases during the period between time T1 and time T2 once and then decreases, but the difference in potential between electrode 15A and electrode 15B continues to increase little by little during the period between time T1 and time T2.

As illustrated in FIG. 3, time T3 corresponds to the timing at which the difference in potential between electrode 15A and electrode 15B of fuse 15 is peaked. As illustrated in FIG. 4, time T3 is the timing at which the value of the impedance based on the arc discharge at fuse 15 that starts at time T2 begins to roughly match the value of the impedance based on the arc discharge at relay 14 that starts at time T1. The value of the impedance based on the arc discharge at relay 14 and the value of the impedance based on the arc discharge at fuse 15 continue to roughly match for a while after time T3. In other words, constants may be set for relay 14 and fuse 15 such that after both the arc discharge at relay 14 and the arc discharge at fuse 15 transition from an electric discharge transient state to a steady state, relay 14 and fuse 15 have the same impedance or the impedance of fuse 15 becomes greater than the impedance of relay 14.

Subsequently, both the values of the difference in potential between electrode 15A and electrode 15B and electric current I flowing between terminal 12 and terminal 13 are reduced after time T3. As mentioned earlier, the impedance of both of the arc discharge at relay 14 and the arc discharge at fuse 15 increase after time T3. Therefore, electric current I which decreases from a point between time T1 and time T2 continues to decrease after second time T2 and third time T3. Furthermore, the impedance of both the arc discharge at relay 14 and the arc discharge at fuse 15 continues to increase, and thus electric current I decreases sharply after time T3 (refer to FIG. 3). The difference in potential between electrode 15A and electrode 15B of fuse 15 also decreases sharply.

In other words, this indicates a change in which the arc discharge at relay 14 and the arc discharge at fuse 15 become less likely to continue as time passes. The impedance at time T3 has a large value than the impedance at time T2 at which at least one of the arc discharge at relay 14 and the arc discharge at fuse 15 is less likely to occur. Thereafter, when the arc discharge at one of relay 14 and fuse 15 ceases to occur, the arc discharge at the other will also cease to occur accordingly.

As a result, the impedance between terminal 12 and terminal 13 increases sharply after time T3. Furthermore, at least one of relay 14 and fuse 15 is cut off in a short time, and terminal 12 and terminal 13 are electrically disconnected.

In the present exemplary embodiment, using the electric arcs that occur at both of relay 14 and fuse 15, the impedance of both of relay 14 and fuse 15 can be gradually increased over time, via time T1, time T2, and time T3, to disconnect terminal 12 and terminal 13. Thus, it is possible to place fuse 15 in a high impedance state in a short time without providing, on relay 14, a mechanism for coercively maintaining the connection of contact portion 14A and contact portion 14B. As a result, protection system 11A can be small in size.

Note that the values of both the difference in potential between electrode 15A and electrode 15B and electric current I may be reduced after time T3 so that the difference in potential between electrode 15A and electrode 15B has a local minimum value at time T4, and then electric current I may be cut off at time T4.

As mentioned earlier, it is desirable that the value of the impedance based on the arc discharge at relay 14 and the value of the impedance based on the arc discharge at fuse 15 continue to roughly match after time T3. However, relay 14 and fuse 15 are structurally different; in particular, the arc discharge occurs in gas at relay 14 while the arc discharge occurs in a mixture of gas and other insulators at fuse 15. Therefore, the arc discharge at fuse 15 after time T3 can be quickly weakened compared to the arc discharge at relay 14. This makes it possible to set the difference in potential between electrode 15A and electrode 15B to the local minimum value at time T4. As a result, at time T4, relay 14 and fuse 15 allow terminal 12 and terminal 13 to reach the highly insulative disconnected state in a short time.

Furthermore, the impedance between electrode 15A and electrode 15B may be increased during both the period between time T2 and time T3 and the period between time T3 and time T4, and the rate of increase of the impedance during the period between time T2 and time T3 may be set greater than the rate of increase of the impedance during the period between time T3 and time T4. As mentioned earlier, in fuse 15, the conductor begins to melt or blow at time T2, and fuse 15 changes into the arc-discharge conducting state at time T3. Therefore, the rate of increase of the impedance during the period between time T2 and time T3 can be set great compared to the rate of increase of the impedance of fuse 15 in the arc-discharge conducting state after time T3. Thus, it is possible to significantly reduce electric current I after time T2. In other words, it is possible to reduce electric current I in a short time by increasing the rate of increase of the impedance between electrode 15A and electrode 15B during the period between time T2 and time T3. As a result, terminal 12 and terminal 13 are disconnected in a short time.

When controller 16 detects that the value of electric current I has exceeded first threshold value Ith1 at initial time T0 mentioned earlier, controller 16 instructs relay 14 to separate contact portion 14A and contact portion 14B. This instruction may continue after time T4.

When electric current I exceeds first threshold value Ith1 at initial time T0, the arc discharge occurs at relay 14 regardless of the instruction provided from controller 16 to relay 14. Subsequently, fuse 15 blows at time T2 and changes from the connected state into the arc-discharge conducting state and when protection system 11A is completely disconnected at time T4 or later, the arc discharge at fuse 15 that has disappeared once will never occur again even when contact portion 14A and contact portion 14B of relay 14 are in contact. Thus, contact portion 14A and contact portion 14B of relay 14 that are in contact cause no problem.

On the other hand, when controller 16 detects that the value of electric current I has exceeded first threshold value Ith1 at initial time T0, controller 16 instructs relay 14 to separate contact portion 14A and contact portion 14B or reduces an electric current to be supplied to a coil unit (not illustrated in the drawings) that is embedded in relay 14 and generates a magnetic force. This instruction may continue after time T4. With this, it is possible to maintain a more reliable disconnection state.

The foregoing describes the form illustrated in FIG. 5 in which relay 14 and relay 22 are provided as mentioned earlier.

Figure 6:
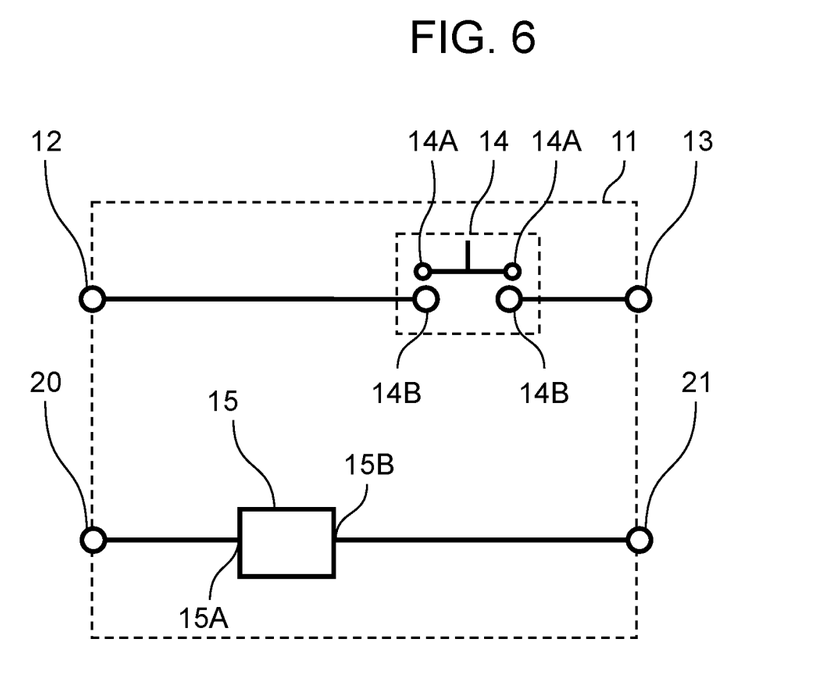
FIG. 6 is a block diagram illustrating the configuration of a protection system according to another exemplary embodiment of the present disclosure.

Note that as illustrated in FIG. 6, relay 14 may be provided between a positive electric potential-side terminal (terminal 12) and a positive electric potential-side terminal (terminal 13), and fuse 15 may be provided between a negative electric potential-side terminal (terminal 20) and a negative electric potential-side terminal (terminal 21).

Figure 7:
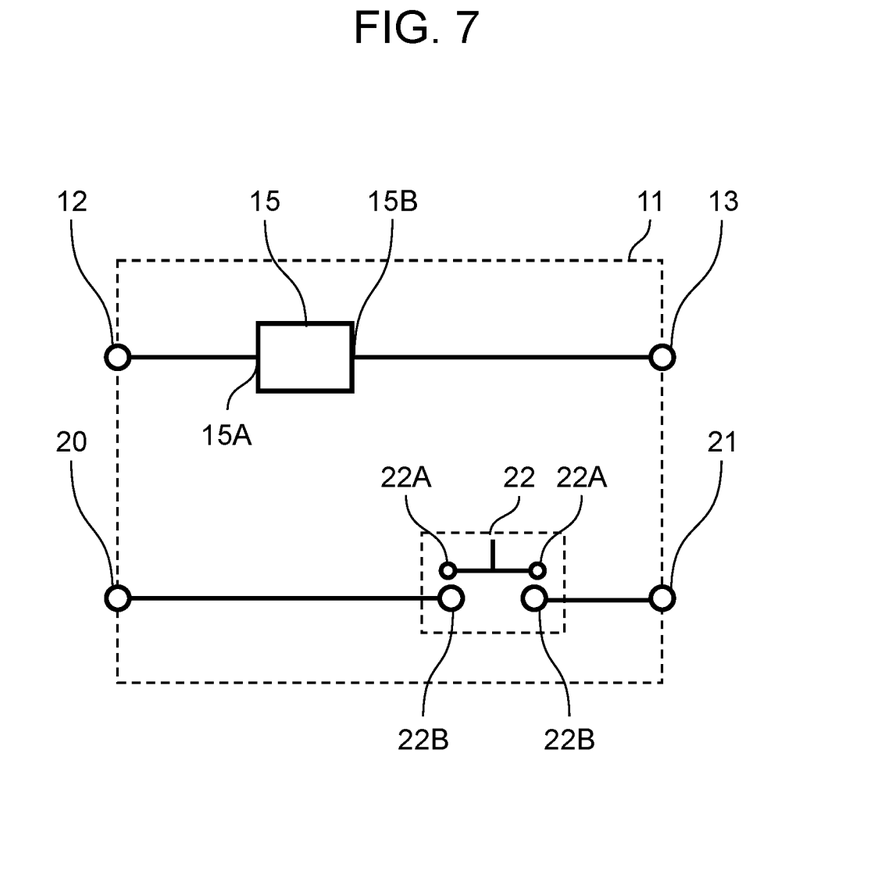
FIG. 7 is a block diagram illustrating the configuration of a protection system according to another exemplary embodiment of the present disclosure.

Furthermore, as illustrated in FIG. 7, fuse 15 may be provided between a positive electric potential-side terminal (terminal 12) and a positive electric potential-side terminal (terminal 13), and relay 14 may be provided between a negative electric potential-side terminal (terminal 20) and a negative electric potential-side terminal (terminal 21).

Note that protection device 11 illustrated in each of FIG. 6 and FIG. 7 is also controlled by controller 16 as in protection system 11A described with reference to FIG. 2.

In the above description and drawings, time T0, T1, T2, T3, T4 indicates a timing or a point in time. Here, there are cases where a change in the electric current, the voltage, or the impedance is not an instant change, but is a value changing over a certain period of time. Therefore, in particular, time T0, T1, T2, T3, T4 can be described as a time slot having a certain length.

CLOSING

A protection system according to one aspect of the present disclosure includes: terminal 12; terminal 13; relay 14 including contact portion 14A and contact portion 14B and configured to be opened and closed by contact and separation of contact portion 14A and contact portion 14B; and fuse 15 including electrode 15A and electrode 15B. Relay 14 and fuse 15 are connected in series between terminal 12 and terminal 13. When an electric current exceeding first threshold value Ith1 flows to relay 14, contact portion 14A and contact portion 14B are separated in relay 14 at time T1 at which an electric current flowing to relay 14 exceeds first threshold value Ith1. When contact portion 14A and contact portion 14B are separated, an arc discharge occurs between contact portion 14A and contact portion 14B. An arc discharge occurs between electrode 15A and electrode 15B of fuse 15 at time T2 later than time T1. The arc discharge occurs at both of relay 14 and fuse 15 and a difference in potential between electrode 15A of fuse 15 and electrode 15B of fuse 15 increases during a period between time T2 and time T3 later than time T2. Terminal 12 and terminal 13 are disconnected at time T4 later than time T3.

Furthermore, a protection system according to another aspect of the present disclosure further includes controller 16, and controller 16 controls the separation of contact portion 14A and contact portion 14B of relay 14.

Furthermore, in a protection system according to another aspect of the present disclosure, during a period between time T3 and time T4, the difference in potential between electrode 15A and electrode 15B decreases, and an electric current flowing between terminal 12 and terminal 13 is reduced.

Furthermore, in a protection system according to another aspect of the present disclosure, impedance of fuse 15 between electrode 15A and second electrode 15B increases in each of a first period between time T2 and time T3 and a second period between time T3 and the time T4, and a rate of increase of the impedance of fuse 15 in the first period is greater than a rate of increase of the impedance of fuse 15 in the second period.

Furthermore, a protection system according to another aspect of the present disclosure further includes relay driver 23, and relay driver 23 controls a timing of the separation of contact portion 14A and contact portion 14B of relay 14.

Furthermore, a protection system according to another aspect of the present disclosure further includes terminal 20, terminal 21, and relay 22 connected between terminal 20 and terminal 21.

Furthermore, in a protection system according to another aspect of the present disclosure, relay 14 is connected between terminal 12 and terminal 13, and fuse 15 is connected between terminal 20 and terminal 21.

Furthermore, in a protection system according to another aspect of the present disclosure, fuse 15 is connected between terminal 12 and terminal 13, and relay 22 is connected between terminal 20 and terminal 21.

INDUSTRIAL APPLICABILITY

A protection system according to the present disclosure is advantageous in that downsizing is possible while maintaining disconnection performance, and is useful in various electronic devices.

REFERENCE MARKS IN THE DRAWINGS 11 protection device
11A protection system
12 terminal
13 terminal
14 relay
14A contact portion
14B contact portion
15 fuse
15A electrode
15B electrode
16 controller
17 electric current sensor
18 direct-current power supply
19 load
20 terminal
21 terminal
22 relay
22A contact portion
22B contact portion
23 relay driver

The invention claimed is:

1. A protection system, comprising:
a first terminal;
a second terminal;
a relay connected to the first terminal,
a fuse connected to the second terminal, and
a controller; wherein
the relay includes a first contact portion and a second contact portion,
the fuse includes a first electrode and a second electrode, the fuse configured to explode so as to disconnect the first electrode and the second electrode from each other,
when an electric current exceeding a threshold current flows to the relay, the first contact portion and the second contact portion are configured to separated from each other and an arc discharge occurs between the first contact portion and the second contact portion,
the controller transmits a signal to cause the fuse to explode so that the first electrode and the second electrode are separated from each other and an arc discharge occurs between the first electrode and the second electrode during occurrence of the arc discharge between the first contact portion and the second contact portion, and
after the controller transmits the signal to the fuse, the arc discharges occur at both of between the first contact portion and the second contact portion and between the first electrode and the second electrode, and the first terminal and the second terminal are disconnected from each other.

2. The protection system according to claim 1, wherein the relay is configured to connect to a load via the first terminal,
the fuse is configured to connect to a power supply via the second terminal, and
after the first contact portion and the second contact portion are separated from each other and the arc discharge occurs between the first contact portion and the second contact portion, the controller transmits the signal to cause the fuse to explode, so that the arc discharges occur at both of between the first contact portion and the second contact portion and between the first electrode and the second electrode, a difference in potential between the first electrode and the second electrode increases, and the load and the power supply are disconnected.

3. The protection system according to claim 1, wherein the first terminal is a first positive terminal,
the second terminal is a second positive terminal, and
the relay and the fuse are directly connected between the first positive terminal and the second positive terminal.

4. The protection system according to claim 1, further comprising an electric current sensor.

5. The protection system according to claim 4, wherein as the electric current sensor detects that an electric current exceeding the threshold current flows to the relay, the controller transmits the signal to cause the fuse to explode.

6. The protection system according to claim 4, wherein as the electric current sensor detects that an electric current exceeding the threshold current flows to the relay, the controller transmits a signal to the relay to separate the first contact portion and the second contact portion from each other.

7. The protection system according to claim 4, wherein as the electric current sensor detects an electric current exceeding the threshold current flows to the relay, the controller causes a state that the first electrode and the second electrode are separated from each other by sending a signal to the relay.

8. The protection system according to claim 1, wherein the relay is configured to connect to a load via the first terminal,
the fuse is configured to connect to a power supply via the second terminal, and
during occurrence of the arc discharges at both of between the first contact portion and the second contact portion and between the first electrode and the second electrode, an impedance between the load and the power supply increases.

* * * * *